United States Patent
Fan (10) Patent No.: US 10,175,529 B2
(45) Date of Patent: Jan. 8, 2019

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 257 days.

(21) Appl. No.: 15/108,298

(22) PCT Filed: Jun. 12, 2016

(86) PCT No.: PCT/CN2016/085469
§ 371 (c)(1),
(2) Date: Jun. 25, 2016

(87) PCT Pub. No.: WO2017/201774
PCT Pub. Date: Nov. 30, 2017

(65) Prior Publication Data
US 2018/0101065 A1    Apr. 12, 2018

(30) Foreign Application Priority Data
May 24, 2016    (CN) .......................... 2016 1 0349813

(51) Int. Cl.
*G02F 1/1335*    (2006.01)
*G02B 5/28*    (2006.01)

(52) U.S. Cl.
CPC .......... *G02F 1/133603* (2013.01); *G02B 5/28* (2013.01); *G02F 1/133606* (2013.01);
(Continued)

(58) Field of Classification Search
CPC .......... G02F 1/133603; G02F 1/133609; G02F 1/133606; G02F 1/133621; G02F 2001/133614; G02B 5/28
See application file for complete search history.

(56) References Cited

U.S. PATENT DOCUMENTS

2008/0094528 A1* 4/2008 Robinson ............... G02B 5/285
349/1
2011/0007506 A1* 1/2011 Kinoshita ............ G02B 6/0096
362/235
(Continued)

FOREIGN PATENT DOCUMENTS

CN    105068303 A    11/2015
CN    105093662 A    11/2015
(Continued)

OTHER PUBLICATIONS

Machine English Translation of JP2005234134A Sep. 2, 2005 Haga et al.*

*Primary Examiner* — Anh Mai
*Assistant Examiner* — Glenn Zimmerman
(74) *Attorney, Agent, or Firm* — Andrew C. Cheng (57) ABSTRACT

The present disclosure discloses a backlight module and a liquid crystal display device, the backlight module includes a light source; a spectrally selective element arranged in the light path between the light source to the light-emitting surface of the backlight module, is used to pass through the red, green and blue spectral and limit or block the remaining spectrum. Through the above, the present disclosure may increase the color gamut of the display device and improve the color saturation of the display device.

14 Claims, 4 Drawing Sheets

(52) U.S. Cl.
CPC .. *G02F 1/133609* (2013.01); *G02F 1/133621* (2013.01); *G02F 2001/133614* (2013.01)

(56) References Cited

U.S. PATENT DOCUMENTS

2015/0070900 A1* 3/2015 Fleming .................... F21V 5/04
                                                        362/308
2015/0339996 A1* 11/2015 Schuck ............. G02F 1/133603
                                                        345/88
2017/0293066 A1* 10/2017 Van Bommel ....... G02B 6/0026

FOREIGN PATENT DOCUMENTS

| | | | | |
|---|---|---|---|---|
| CN | 105182612 A | 12/2015 | | |
| JP | 2005234132 A | 9/2005 | | |
| JP | 2005234134 A | 9/2005 | | |
| JP | 2006145885 A | 6/2006 | | |
| WO | WO 2016050687 A1 * | 4/2016 | ........... | G02B 6/0026 |

* cited by examiner

FIG 7

BACKLIGHT MODULE AND LIQUID CRYSTAL DISPLAY DEVICE

FIELD OF THE DISCLOSURE

The present disclosure relates to a display technology field, and more particularly to a backlight module and a liquid crystal display device.

BACKGROUND OF THE DISCLOSURE

In the currently liquid crystal display device, commonly used white LED (Light-Emitting Diode) as a backlight source. The most popular white LED is the LED of the blue emitting chip adding the yellow YAG (Y3A15O12, Yttrium aluminum garnet) phosphor, after using the LED of the yellow phosphor material to match the LCD screen, the color saturation is low and the color of the display is not colorful enough.

Figure 1:
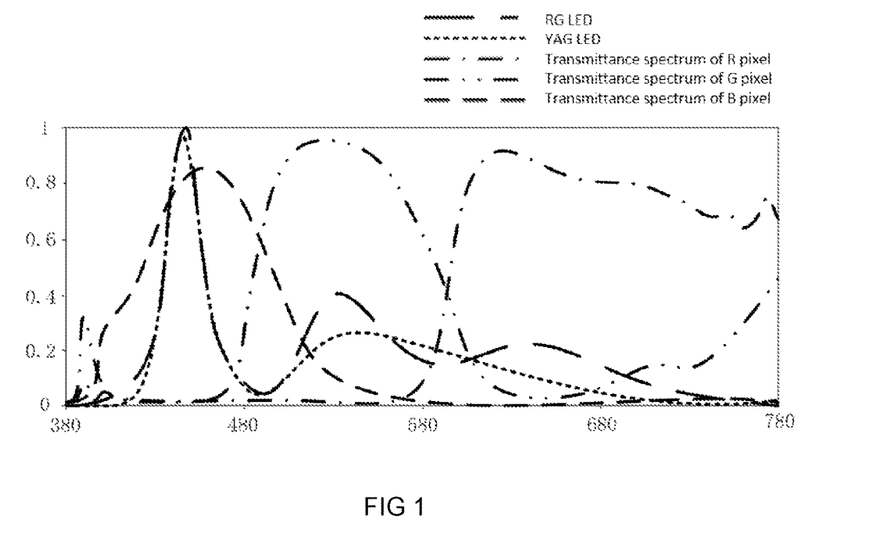
FIG. 1 is a color saturation contrast schematic of the RG phosphor and the YAG phosphor in the background of the present disclosure.

Refer to FIG. 1, FIG. 1 is a color saturation contrast schematic of the RG phosphor and the YAG phosphor in the background of the present disclosure, it can be seen from the figure. In comparison of the LED of the YAG phosphor, because the LED backlight of the RG phosphor is narrower by the spectrum FWHM (full-width-at half-maximum) of the R and G pixel, the R and G color is more pure and is possible to achieve higher color saturation.

In order to increase the color saturation, usually by the yellow phosphor change to the RG (red and green) phosphor, but this approach requires the replacement of the existing liquid crystal display LED device can no longer direct promote the color gamut based on the existing light source.

Currently in high color saturation LCD backlight technology, the color gamut can reach the highest is quantum dot material containing Cd (cadmium) element, since the Cd has a very big impact on human health and the quantum dot film is very expensive, the development of the high color saturation technology without Cd and with low cost is the trend of the development of the high color saturation of the LCD device.

SUMMARY OF THE DISCLOSURE

The present disclosure to solve the technical problem is to provide a backlight module and a liquid crystal display device, can increase the color gamut of the display device and improve the color saturation.

To solve the above technical problem, a technical solution of the present disclosure used is: providing a backlight module, the backlight module includes: a light source; wherein, the light source includes a blue LED, and a yellow phosphor or a red and green phosphor arranged on the light-emitting surface of the blue LED. A spectrally selective element arranged in the light path between the light source to the light-emitting surface of the backlight module, is used to pass through the red, green and blue spectral and limit or block the remaining spectrum; wherein, the spectrally selective element is a multilayer element alternately stacked the high and low refractive index layer.

Wherein, further includes a collimating element emitting to the spectrally selective element after collimating or converging the light emitted by the light source.

Wherein, the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h are satisfy the following conditions:

$$\tan\alpha = \frac{h+a}{2b} < \tan 30°$$

Wherein, further includes a light guide plate, the light source and the collimating element are arranged close to the sides of the light guide plate, further the collimating element is between the light source and the sides of the light guide plate.

Wherein, the refractive index of the high refractive index layer for the wavelength 550 nm is 2.0-2.8, the refractive index of the low refractive index layer for the wavelength 550 nm is 1.3-1.8, and the layers are greater than 40.

Wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

To solve the above technical problem, another technical solution of the present disclosure used is: providing a backlight module, the backlight module includes: a light source; a spectrally selective element arranged in the light path between light source to the light-emitting surface of the backlight module, is used to pass through the red, green and blue spectral and limit or block the remaining spectrum.

Wherein, the spectrally selective element is a multilayer element alternately stacked the high and low refractive index layer.

Wherein, further includes a collimating element emitting to the spectrally selective element after collimating or converging the light emitted by the light source.

Wherein, the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h are satisfy the following conditions:

$$\tan\alpha = \frac{h+a}{2b} < \tan 30°$$

Wherein, further includes a light guide plate, the light source and the collimating element are arranged close to the sides of the light guide plate, further the collimating element is between the light source and the sides of the light guide plate.

Wherein, the refractive index of the high refractive index layer for the wavelength 550 nm is 2.0-2.8, the refractive index of the low refractive index layer for the wavelength 550 nm is 1.3-1.8, and the layers are greater than 40.

Wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

Wherein, the light source includes a blue LED, and a yellow phosphor or a red and green phosphor arranged on the light-emitting surface of the blue LED.

To solve the above technical problem, the other technical solution of the present disclosure used is: providing a liquid crystal display device, the liquid crystal display device includes a display panel, a backlight module and a spectrally selective element; the backlight module includes a light source, the spectrally selective element is arranged in the light path between the light source to the light-emitting surface of the backlight module, is used to pass through the red, green and blue spectral and limit or block the remaining spectrum.

Wherein, the spectrally selective element is a multilayer element alternately stacked the high and low refractive index layer.

Wherein, further includes a collimating element emitting to the spectrally selective element after collimating or converging the light emitted by the light source.

Wherein, the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h are satisfy the following conditions:

$$\tan \alpha = \frac{h+a}{2b} < \tan 30°$$

Wherein, further includes a light guide plate, the light source and the collimating element are arranged close to the sides of the light guide plate, further the collimating element is between the light source and the sides of the light guide plate.

Wherein, the refractive index of the high refractive index layer for the wavelength 550 nm is 2.0-2.8, the refractive index of the low refractive index layer for the wavelength 550 nm is 1.3-1.8, and the layers are greater than 40.

Wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

Wherein, the light source includes a blue LED, and a yellow phosphor or a red and green phosphor arranged on the light-emitting surface of the blue LED.

The beneficial effects of the present disclosure are: the situation is different from the prior art, the backlight module of the present disclosure includes a light source and a spectrally selective element; wherein, the spectrally selective element arranged in the light path between the light source to the light-emitting surface of the backlight module, is used to pass through the red, green and blue spectral and limit or block the remaining spectrum. By the above-described manner, it can filter the undesired spectra of the light source, and selectively pass the red, green and blue spectrum of the display device required, the color gamut of the display device is increased and the color saturation of the display device is improved.

DETAILED DESCRIPTION OF PREFERRED EMBODIMENTS

Figure 2:
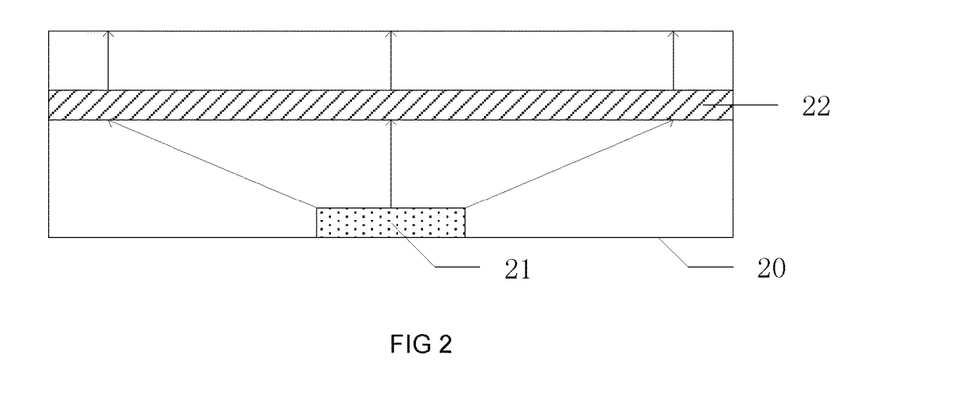
FIG. 2 is a structural schematic view of the first embodiment of the backlight module of the present disclosure.

Refer to FIG. 2, FIG. 2 is a structural schematic view of the first embodiment of the backlight module of the present disclosure, the backlight module 20 includes a light source 21 and a spectrally selective element 22; wherein, the spectrally selective element 22 is arranged in the light path between the light source 21 to the light-emitting surface of the backlight module 20, the spectrally selective element 22 is used to pass through the red, green and blue spectrum and limit or block the remaining spectrum.

Understandable, FIG. 2 is a structural schematic view of the first embodiment of the backlight module of the present disclosure, number of the light sources 21 are also not limited to one, it may be a plurality of light sources arrayed; in the other embodiments, the backlight module 20 may also be a side-in backlight module, i.e. the light source 21 is arranged on the side of the backlight module 20.

Optionally, the light source 21 includes a blue LED and a yellow phosphor (YAG phosphor) arranged on the light-emitting surface of the blue LED.

Optionally, the light source 21 includes a blue LED and a red and green phosphor (RG phosphor) arranged on the light-emitting surface of the blue LED.

Optionally, the spectrally selective element 22 is a multilayer element alternately stacked the high and low refractive index layer. Wherein, the element may be an optical diaphragm or an optical thin film. In one embodiment, the layers of spectrally selective element 22 is greater than 40, wherein, the refractive index of the high refractive index layer for the wavelength 550 nm is 2.0-2.8, and the refractive index of the low refractive index layer for the wavelength 550 nm is 1.3-1.8.

Optionally, the passing rate of the spectrally selective element 22 corresponding to the wavelength 425-470 nm, 510-560 nm and the 610-730 nm are not less than 80%, the passing rate corresponding to the wavelength 480-505 and 570-605 nm are less than 20%.

Preferably, the spectrally selective element 22 corresponding to the wavelength 425-470 nm, 510-560 nm and the 610-730 nm are not less than 90%, the passing rate corresponding to the wavelength 480-505 and 570-605 nm are less than 10%.

The situation is different from the prior art, the backlight module of the present embodiment includes a light source and a spectrally selective element; wherein, the spectrally selective element is arranged in the light path between the light source to the light-emitting surface of the backlight module, the spectrally selective element is used to pass through the red, green and blue spectral and limit or block the remaining spectrum. Through the above, it can filter the undesired spectra of the light source, and selectively pass the red, green and blue spectrum of the display device required, the color gamut of the display device is increased and the color saturation of the display device is improved.

Figure 3:
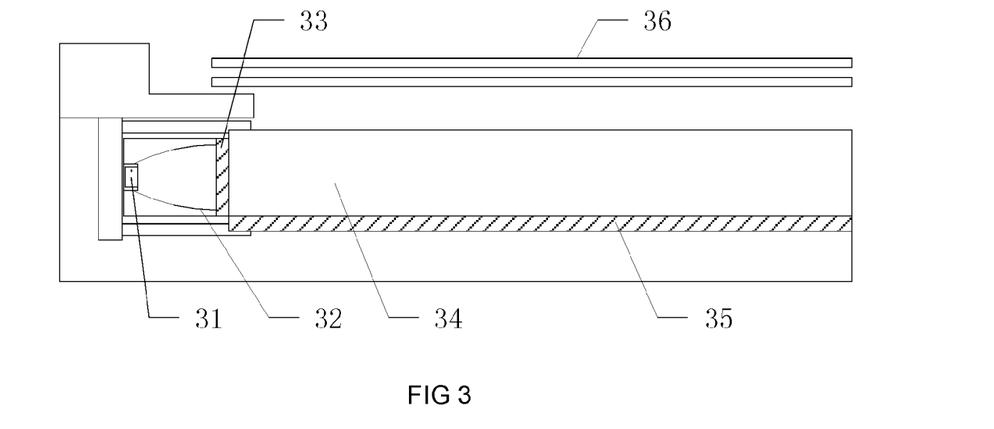
FIG. 3 is a structural schematic view of the second embodiment of the backlight module of the present disclosure.

Refer to FIG. 3, FIG. 3 is a structural schematic view of the second embodiment of the backlight module of the present disclosure, the backlight module includes a light source 31, a collimating element 32, a spectrally selective element 33, wherein, the collimating element 32 is used to emit the light emitted by the light source 31 to the spectrally selective element 33 after collimating or converging.

Figure 4:
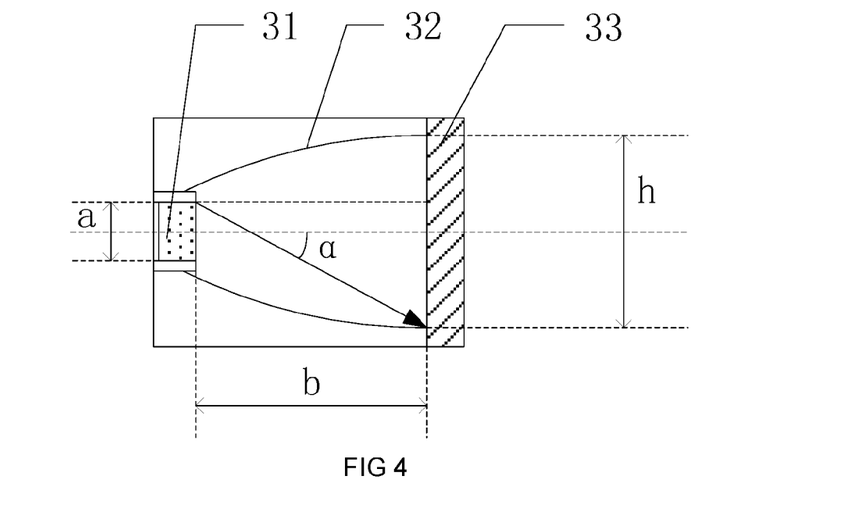
FIG. 4 is a partial schematic view of the optical path of the second embodiment of the backlight module of the present disclosure.

As shown in FIG. 4, FIG. 4 is a partial schematic view of the optical path of the second embodiment of the backlight module of the present disclosure, the collimating element 32 is a parabolic collimator lens, the light-emitting surface of the light source 31 is arranged on the focal point of the parabolic collimator lens, i.e. the middle point of the light-emitting surface of the light source 31 is coincide with the focal point of the parabolic collimator lens, and the light-emitting surface of the light source 31 is parallel with the opening surface of the parabolic collimator lens.

Wherein, the spectrally selective element 33 is a spectrum conversion film with multilayer optical film (also known as light color conversion film) alternately stacked the high and low refractive index layer, e.g. organic/inorganic composite color conversion film, since the spectrum conversion film with multilayer optical film in the case of smaller angle of incidence of the light has an excellent RGB filter characteristic to narrow down the FWHM of the RGB three color light spectrum and to achieve high color saturation of the LCD; as for the large angle of incident light, the optical characteristic of the RGB is not well.

Therefore, in order to make the light incident on the spectrum conversion film with multilayer optical film incident in a smaller angle of incidence α, add a parabolic collimator lens in front of the spectrum conversion film with multilayer optical film is required.

Specifically, the width of the light-emitting surface of the light source a, the distance from the focal point to the terminal surface of the parabolic collimator lens b and the opening width of the parabolic collimator lens h are satisfy the following conditions:

$$\tan \alpha = \frac{h+a}{2b} < \tan 30°$$

Thus, the light generated by the light source 31 can emits in a smaller angle of incidence α to the spectrally selective element 33 to improve the color saturation of the display device.

Continuing to refer to FIG. 3, optionally, in the other embodiment, the backlight module further includes a light guide plate 34, a reflective sheet 35 and a optical diaphragm 36.

Wherein, the light source 31 and the collimating element 32 are arranged close to the sides of the light guide plate 34, the collimating element 32 is between the light source 31 and the side of the light guide plate 34, and the spectrally selective element 33 is between the collimating element 32 and the side of the light guide plate 34.

Optionally, in the other embodiment, the spectrally selective element 33 further may arranged on the light-emitting surface of the light guide plate 34.

Optionally, in the other embodiment, the spectrally selective element 33 further may arranged at the lower surface of the liquid crystal panel (not shown).

Optionally, the spectrally selective element 33 includes a glass substrate and a high and low refractive index layer arranged on the glass substrate;

Optionally, the spectrally selective element 33 may be fixed directly to the high and low refractive index layer of the side of the light guide plate 34 or the light-emitting surface of the collimating element.

Figure 5:
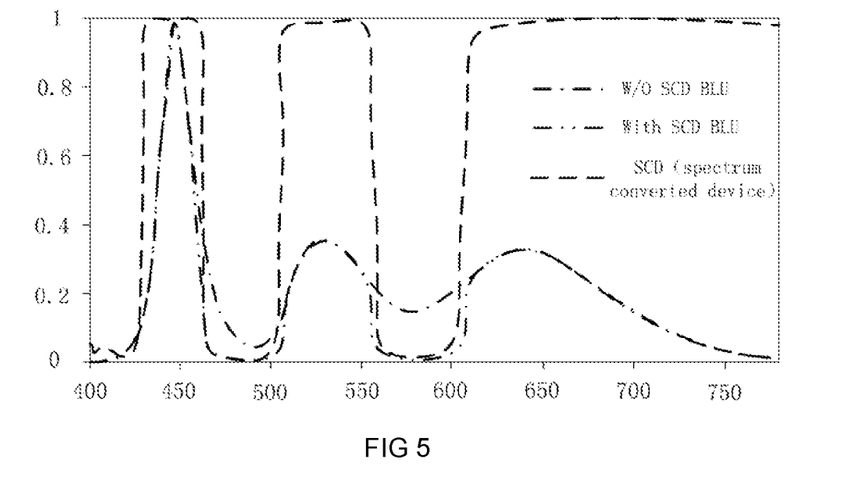
FIG. 5 is a transmittance spectrum corresponding to the table 1 in the second embodiment of the backlight module of the present disclosure.
Figure 6:
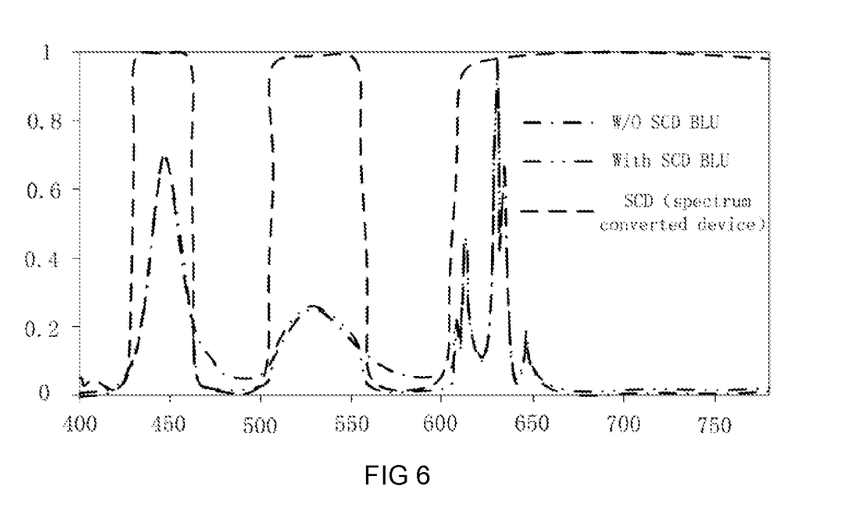
FIG. 6 is a transmittance spectrum corresponding to the table 2 in the second embodiment of the backlight module of the present disclosure.

Refer to the following table and the FIG. 5 and FIG. 6, FIG. 5 is a transmittance spectrum corresponding to the table 1 in the second embodiment of the backlight module of the present disclosure, FIG. 6 is a transmittance spectrum corresponding to the table 2 in the second embodiment of the backlight module of the present disclosure; in the FIG. 5 and the FIG. 6, the abscissa represents frequency, the ordinate represents transmittance.

TABLE 1

| | LED of the RG phosphor | | | | |
|---|---|---|---|---|---|
| BL light source | OC | LCM W-x | LCM W-y | LCM Lv | NTSC |
| W/O SCD | ST5461D05-1 | 0.280 | 0.290 | 100% | 88.40% |
| With SCD | ST5461D05-1 | 0.262 | 0.278 | 75% | 110.80% |
| With SCD | ST5461D05-1 | 0.280 | 0.290 | 75% | 110.80% |

TABLE 2

| | LED of the fluoride phosphor | | | | |
|---|---|---|---|---|---|
| BL light source | OC | LCM W-x | LCM W-y | LCM Lv | NTSC |
| W/O SCD | ST5461D05-1 | 0.280 | 0.290 | 100% | 93.60% |
| With SCD | ST5461D05-1 | 0.278 | 0.285 | 81% | 110.10% |
| With SCD | ST5461D05-1 | 0.280 | 0.290 | 81% | 110.80% |

From the above chart, by the above-described manner, the color saturation of the LCD device can be raised to more than 110%, it can reach the color gamut like the QDs film (quantum dots film), and the backlight efficiency is equal to the QDs film. Further, the present embodiment can without using the QDs element with the Cd hazard to human health, just using the conventional white LED, it can has the good longevity and reliability and the cost of QDs film is much lower.

Figure 7:
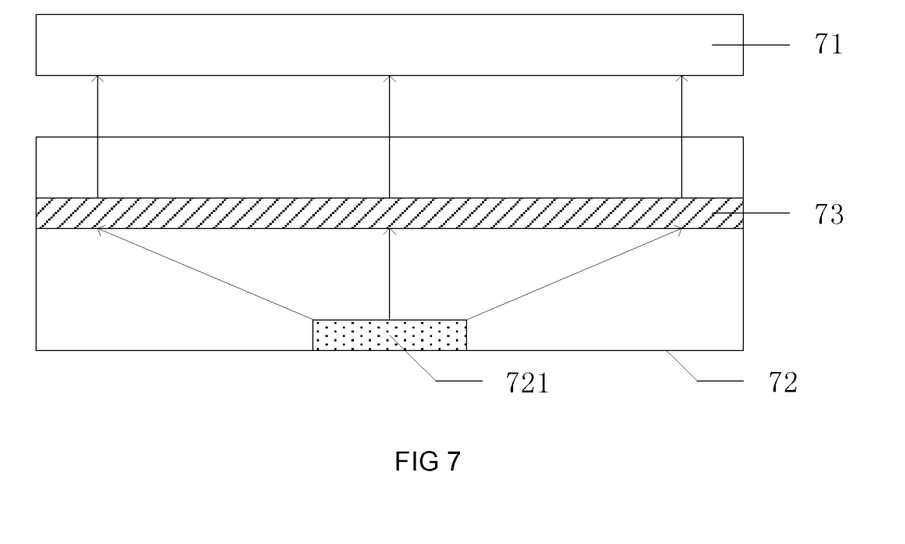
FIG. 7 is a structural schematic view of one embodiment of the liquid crystal display device of the present disclosure.

Refer to FIG. 7, FIG. 7 is a structural schematic view of one embodiment of the liquid crystal display device of the present disclosure, the LCD device includes a display panel 71, a backlight module 72 and a spectrally selective element 73; the backlight module 72 includes a light source 721, the spectrally selective element 73 is arranged in the light path between the light source 721 to the light-incoming surface of the display panel 71, pass through the red, green and blue spectrum and limit or block the remaining spectrum.

Optionally, the spectrally selective element 73 is such as the spectrally selective element in each of the above embodiments, and principles and structure of the specific embodiments are similar, not repeat them here.

Understandable, FIG. 7 only shows a structure of back-in backlight module, in the other embodiments, the LCD device may also be a side-in backlight module, the LCD device with the side-in backlight module may refer to the second embodiment of the above backlight module, not repeat them here.

The situation is different from the prior art, the LCD device of the present embodiment includes a panel and a backlight module and a spectrally selective element; the backlight module includes a light source, the spectrally selective element is arranged in the light path between the light source to the light-incoming surface of the display panel, pass through the red, green and blue spectral and limit or block the remaining spectrum. Through the above, it can filter the undesired spectra of the light source, and selectively pass the red, green and blue spectrum of the display device required, the color gamut of the display device is increased and the color saturation of the display device is improved.

Above are only embodiments of the present disclosure is not patented and therefore limit the scope of the disclosure, all the contents of the present disclosure utilize the specification made equivalent structures or equivalent process transformation, either directly or indirectly related technologies used in other areas are included in the patent empathy scope of the disclosure.

What is claimed is:

1. A backlight module which comprises:
    a light source; wherein, the light source comprises a blue LED, and a yellow phosphor or a red and green phosphor arranged on the light-emitting surface of the blue LED;
    a spectrally selective element arranged in the light path between the light source to the light-emitting surface of the backlight module, is used to pass through the red, green and blue spectral and limit or block the remaining spectrum; wherein, the spectrally selective element is a multilayer element alternately stacked the high and low refractive index layer;
    wherein, the backlight module further comprises a collimating element configured for collimating or converging the light emitted from the light source and then transmitting the collimated or converged light to the spectrally selective element;
    the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h satisfy the following conditions:

$$\tan\alpha = \frac{h+a}{2b} < \tan 30°,$$

such that the collimating element cooperates with the spectrally selective element for ensuring the light emitted from the light source to emit to the spectrally selective element in an incident angle less than 30°.

2. The backlight module according to claim 1, wherein, further comprises a light guide plate, the light source and the collimating element are arranged close to the sides of the light guide plate, further the collimating element is between the light source and the sides of the light guide plate.

3. The backlight module according to claim 1, wherein, the refractive index of the high refractive index layer for the wavelength 550 nm is 2.0-2.8, the refractive index of the low refractive index layer for the wavelength 550 nm is 1.3-1.8, and the layers are greater than 40.

4. The backlight module according to claim 1, wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

5. A backlight module which comprises:
    a light source;
    a spectrally selective element arranged in the light path between light source to the light-emitting surface of the backlight module, is used to pass through the red, green and blue spectral and limit or block the remaining spectrum;
    wherein the backlight module further comprises a collimating element configured for collimating or converging the light emitted from the light source and then transmitting the collimated or converged light to the spectrally selective element;
    the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h satisfy the following conditions:

$$\tan\alpha = \frac{h+a}{2b} < \tan 30°,$$

such that the collimating element cooperates with the spectrally selective element for ensuring the light emitted from the light source to emit to the spectrally selective element in an incident angle less than 30°.

6. The backlight module according to claim 5, wherein, the spectrally selective element is a multilayer element alternately stacked the high and low refractive index layer.

7. The backlight module according to claim 5, wherein, further comprises a light guide plate, the light source and the collimating element are arranged close to the sides of the light guide plate, further the collimating element is between the light source and the sides of the light guide plate.

8. The backlight module according to claim 6, wherein, the refractive index of the high refractive index layer for the wavelength 550 nm is 2.0-2.8, the refractive index of the low refractive index layer for the wavelength 550 nm is 1.3-1.8, and the layers are greater than 40.

9. The backlight module according claim 6, wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

10. A liquid crystal display device, which comprises a display panel, a backlight module and a spectrally selective element; the backlight module comprises a light source, the spectrally selective element is arranged in the light path between the light source to the light-emitting surface of the backlight module and is used to pass through the red, green and blue spectral and limit or block the remaining spectrum;

wherein the backlight module further comprises a collimating element configured for collimating or converging the light emitted from the light source and then transmitting the collimated or converged light to the spectrally selective element;

the collimating element is a parabolic collimator lens, the light-emitting surface of the light source is arranged on the focal point of the parabolic collimator lens, the width of the light-emitting surface of the light source a, the distance from the focal point to the terminal surface of the parabolic collimator lens b and the opening width of the parabolic collimator lens h satisfy the following conditions:

$$\tan\alpha = \frac{h+a}{2b} < \tan 30°,$$

such that the collimating element cooperates with the spectrally selective element for ensuring the light emitted from the light source to emit to the spectrally selective element in an incident angle less than 30°.

11. The LCD device according to claim 10, wherein, the spectrally selective element is a multilayer element alternately stacked the high and low refractive index layer.

12. The LCD device according to claim 10, wherein, further comprises a light guide plate, the light source and the collimating element are arranged close to the sides of the light guide plate, further the collimating element is between the light source and the sides of the light guide plate.

13. The LCD device according to claim 11, wherein, the refractive index of the high refractive index layer for the wavelength 550 nm is 2.0-2.8, the refractive index of the low refractive index layer for the wavelength 550 nm is 1.3-1.8, and the layers are greater than 40.

14. The LCD device according to claim 11, wherein, the passing rate of the spectrally selective element corresponding to the wavelength 425-470 nm, 510-560 nm and the 610-730 nm are not less than 80%, the passing rate corresponding to the wavelength 480-505 and 570-605 nm are less than 20%.

* * * * *